United States Patent
Burgos

(10) Patent No.: US 11,249,879 B2
(45) Date of Patent: Feb. 15, 2022

(54) TIME-TRAVEL DEBUGGING WITH HOT CODE REPLACEMENT

(71) Applicant: Wilson Burgos, Melbourne, FL (US)

(72) Inventor: Wilson Burgos, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 219 days.

(21) Appl. No.: 16/654,801

(22) Filed: Oct. 16, 2019

(65) Prior Publication Data

US 2021/0117308 A1    Apr. 22, 2021

(51) Int. Cl.
*G06F 9/44* (2018.01)
*G06F 11/36* (2006.01)
*G06N 20/00* (2019.01)
*G06F 9/445* (2018.01)
*G06N 5/04* (2006.01)

(52) U.S. Cl.
CPC ...... *G06F 11/3624* (2013.01); *G06F 9/44526* (2013.01); *G06N 5/04* (2013.01); *G06N 20/00* (2019.01)

(58) Field of Classification Search
CPC . G06F 11/3624; G06F 9/44526; G06N 20/00; G06N 5/04
See application file for complete search history.

(56) References Cited

U.S. PATENT DOCUMENTS

| | | | |
|---|---|---|---|
| 10,509,638 B1* | 12/2019 | Gala | G06F 21/53 |
| 2016/0321159 A1* | 11/2016 | Romm | G06F 11/364 |
| 2017/0262299 A1 | 9/2017 | Chow | |
| 2018/0300197 A1* | 10/2018 | Marron | G06F 11/3628 |
| 2019/0213086 A1* | 7/2019 | Vallala | G06F 11/1469 |
| 2019/0227904 A1* | 7/2019 | Raviv | G06F 11/362 |

(Continued)

OTHER PUBLICATIONS

Ken Kahn, Time Travelling Animated Program Execution (Year: 2006).*

(Continued)

*Primary Examiner* — Chat C Do
*Assistant Examiner* — Lenin Paulino
(74) *Attorney, Agent, or Firm* — Tarolli, Sundheim, Covell & Tummino LLP

(57) ABSTRACT

A digital software recorder (DSR) leverages the functionality of a container management software platform, such as Docker, to permit time-travel debugging of a containerized software application, including pausing, playing, rewinding, and fast-forwarding execution of the application, by using snapshots taken by a snapshot manager service as the basis for setting the application state at points in the application's execution, thus saving debugging time that would otherwise be incurred by restarting an application. Snapshots can be triggered manually or automatically based on time or resource utilization threshold criteria. If source code is available to the DSR, the DSR can also enable hot code replacement, wherein modifications to the source code of the application do not require application restart, but instead the application state can be restored to just prior to the execution of the source code modifications. Machine-learning-based anomaly prediction can be used to take snapshots or set debugging information.

20 Claims, 9 Drawing Sheets

(56) References Cited

U.S. PATENT DOCUMENTS

2020/0192689 A1\* 6/2020 Smith, IV .............. G06F 9/4856
2020/0341885 A1\* 10/2020 Plummer .............. G06F 9/3802

OTHER PUBLICATIONS

International Search Report for Application No. PCT/US2020/052617 dated Dec. 22, 2020.
Venkatesh Ranjan Sarpangala, Ranjansv@Gatech Edu et al: "Fast in-memory CRIU for docker containers" Proceedings of the International Symposium on Memory Systems MEMSYS '19, ACM Press, New York, New York, USA, Sep. 30, 2019 (Sep. 30, 2019), pp. 53-65, XP058472865, DOI: 10.1145/3357526.3357542, ISBN: 978-1-4503-7206-0 the whole document
Ken Kahn: "Time travelling animated program executions", Software Visualization, ACM, 2 Penn Plaza, Suite 701NewYorkNY10121-0701USA, Sep. 4, 2006 (Sep. 4, 2006), pp. 185-186, XP058380740, DOI: 10.1145/1148493.1148536, ISBN: 978-1-59593-464-2 abstract; figure 1.
"Global Snapshots for Distributed Debugging ED—Darl Kuhn", ip.com, ip.com Inc., West Henrietta, NY, us, Mar. 24, 2016 (Mar. 24, 2016), XP013171076, ISSN: 1533-0001 the whole document.

\* cited by examiner

```
# Start with an official Ubuntu 16.04 Docker image
FROM ubuntu:16.04

# Install prerequisite Ubuntu packages
RUN apl-get install -y <REQUIRED UBUNTU PACKAGES> \
    && apt-get clean \
    && rm -rf /var/lib/apt/lists/*

# Copy the application into the image
ADD . /app

#Run the app setup script
RUN /app/setup.sh

#Switch to the application directory
WORKDIR /app

#Specify the application startup script
COMMAND /app/start.sh
```

FIG. 8

```
docker run \
    -d \
    -p 8080:80 \
    --name myapp \
    -v /usr/local/var/docker/volumes/myappdata:/var/lib/myappdata \
    -e MYAPPCONFIG=myvalue \
    -e MYAPPARG=myarg \
    --link db:db \
    myappimage:mytag
```

FIG. 9

TIME-TRAVEL DEBUGGING WITH HOT CODE REPLACEMENT

TECHNICAL FIELD

The present invention relates generally to the field of software tools for software code debugging, testing, and analysis, and specifically to methods and systems for time-travel debugging with hot code replacement.

BACKGROUND

The software development cycle conventionally involves writing software code, compiling the code if necessary, executing the code to detect errors or unexpected or undesired behaviors of the software ("bugs"), revising or re-writing one or more portions of the software code to address the detected bugs, re-compiling if necessary, re-executing the software application to confirm that any detected bugs have been fixed and/or to detect any remaining bugs or any new bugs that may have been introduced by the code revision, and repeating this cycle until the software executes to the satisfaction of the developer. While debugging, software may be configured to only execute up until one or more designated breakpoints, whereupon execution is paused to allow the developer to examine the values of variables stored in memory by the software and to consider whether they confirm correct functioning or, on the contrary, are indicative of faulty functioning.

The process of re-executing a software application (which may also require first re-compiling one or more components of the application) and returning to a point in the application's execution where faulty behavior may have been detected can be a time-consuming part of the development cycle. Application restart time varies by application, but on average it can range from about one minute to about thirty minutes. Developers spend an average of ten and a half minutes per coding hour waiting for application restarts. These interruptions incur significant time and money costs in the application development cycle. A breakpoint designated too late to validate or invalidate a hypothesis as to the root cause of a bug results in "overshooting" (late halting of program execution) that can exacerbate bug-fixing times.

Software with new changes to its codebase is often required to undergo regression testing to ensure that a recent code change does not impact features previously confirmed to be working correctly; such regression testing can be extensive, particularly in mature code that has already undergone many development cycles, and may be sensitive to code changes in unexpected ways. Manual execution of regression tests can require significant repetition of tasks that is odious and physically stressful for the human tester and provides an open window for human error, negatively impacting the reliability of software developed this way. Such testing can be improved with, but as yet not completely replaced by, automation.

SUMMARY

One example includes a system for time-travel debugging. A host computer system includes a processor and a non-transitory machine-readable media configured to store a digital software recorder (DSR) application and at least one containerized software application. The processor is configured to execute the DSR application to provide the ability to pause, rewind, and fast-forward execution of the containerized software application. The DSR includes a snapshot manager service configured to take snapshots of a running container of the containerized software application using checkpoint/restore functionality of a container management software platform. The snapshots are based on one or more of manual input of a user, elapsed time of execution of the containerized software application, and/or resource utilization of the containerized software application exceeding or falling below one or more thresholds. The DSR further includes an application containerization service configured to automate the process of creating one or more container images of the containerized software application.

Another example includes a method for time-travel debugging. A host computer system having a processor executes a containerized software application. Snapshots are taken of a running container of the containerized software application using checkpoint/restore functionality of a container management software platform. The snapshots are based on one or more of manual input of a user, elapsed time of execution of the containerized software application, and/ or resource utilization of the containerized software application exceeding or falling below one or more thresholds. A user then time-travels within the execution of the containerized software application by pausing, rewinding, and fast-forwarding the execution of the containerized software application.

Yet another example includes one or more computer-readable media configured to provide a computer as the system set forth above, or to execute in conjunction with a computer the method set forth above. Such an example can include one or more non-transitory computer-readable media storing instructions that when executed by a computer processor, cause the processor to execute, by a host computer system having a processor, a containerized software application; take snapshots of a running container of the containerized software application using checkpoint/restore functionality of a container management software platform, the snapshots being based on one or more of manual input of a user, elapsed time of execution of the containerized software application, and/or resource utilization of the containerized software application exceeding or falling below one or more thresholds; and time-travel within the execution of the containerized software application by pausing, rewinding, and fast-forwarding the execution of the containerized software application based on user input.

BRIEF DESCRIPTION OF THE DRAWINGS

FIG. 8 is a code listing of an example Docker file used to generate a container image.

FIG. 9 is a code listing of an example command used to run a Docker container.

DETAILED DESCRIPTION

The ability to record and replay program executions with low overhead enables many applications, such as reverse-execution debugging, debugging of hard-to reproduce test failures, and "black box" forensic analysis of failures in deployed systems. Existing record-and-replay approaches limit deployability by recording an entire virtual machine (heavyweight), modifying the OS kernel (adding deployment and maintenance costs), requiring pervasive code instrumentation (imposing significant performance and complexity overhead), or modifying compilers and runtime systems (limiting generality).

By contrast, the time-machine debugging and hot code replacement systems and methods of the present application provide a practical record-and-replay functionality without incurring any of the above costs, provided the CPU and operating system meet certain constraints that have recently been met by newer Intel CPUs, Linux kernels, and user-space frameworks. The systems and methods described herein employ a variety of optimizations to provide, in effect, a digital software recorder (DSR) that workloads with limited overhead, with an entirely user-space implementation, using stock hardware, compilers, runtimes and operating systems. The DSR forms the basis of a replay-record execution time-travel debugger.

The functioning of a digital software recorder (DSR) in some ways resembles that of a digital video recorder (DVR), the common household video entertainment appliance capable of recording television programs for watching later ("time shifting"), with playback, pause, rewind, and fast-forward functionality. Analogously, a DSR can provide a software developer with time-travel features such as playback, pause, rewind, and fast-forward of software application execution without requiring time-expensive application restarts, thus reducing the time it takes to fix software defects, especially during extended regression testing, effectively reducing the total cost of developing software systems. A DSR can be provided as a stand-alone software application or as a plugin to one or more integrated development environments (IDEs). Examples of IDEs include Microsoft Visual Studio Code ("VS Code") and Eclipse, either of which can be used to develop software in a variety of programming languages, both compiled and interpreted.

Figure 1:
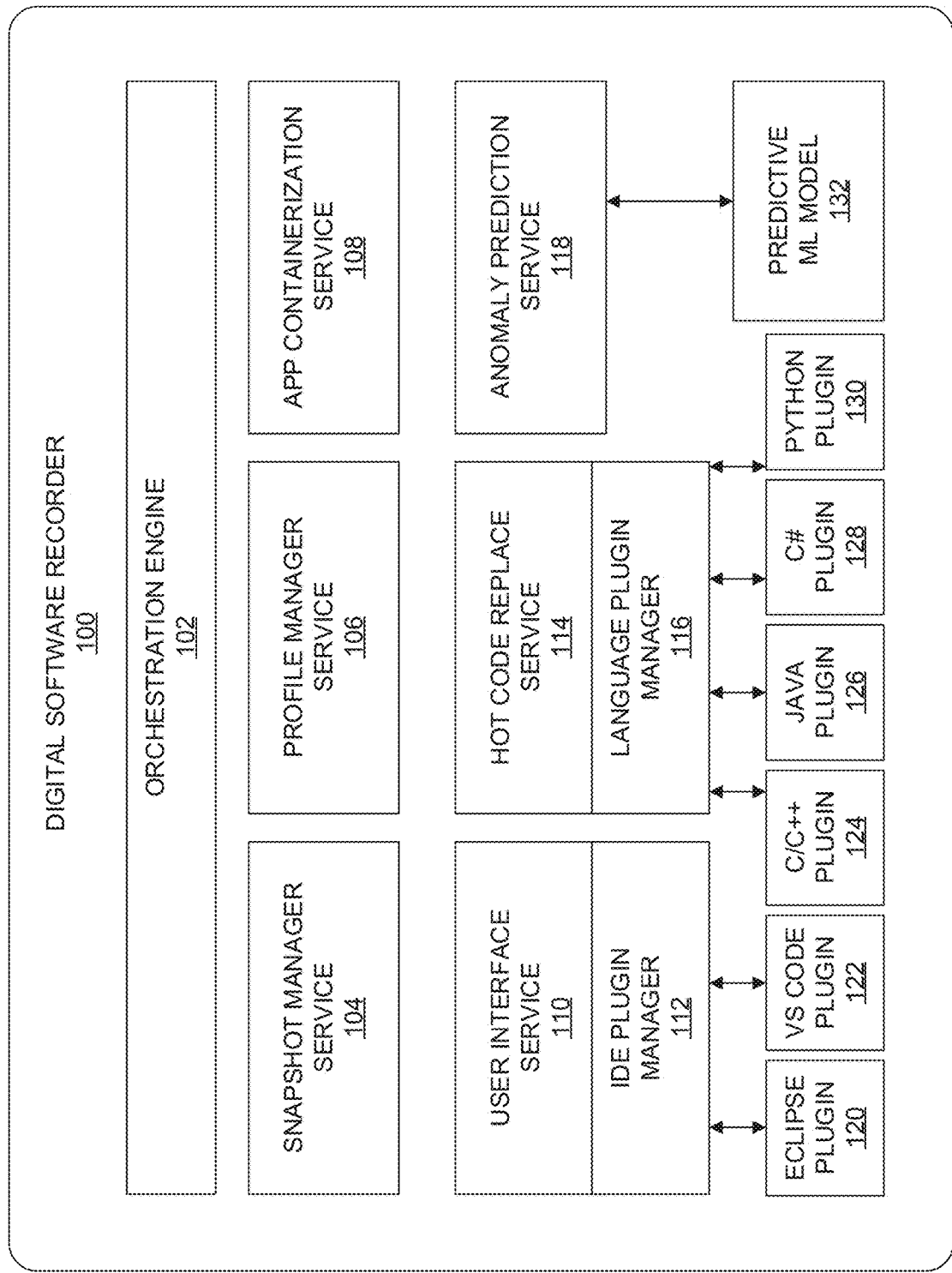
FIG. 1 is a block diagram of an example digital software recorder (DSR) providing time-travel debugging features.

FIG. 1 schematically depicts an example DSR 100 including its various components including an orchestration engine 102 and the various services 104, 106, 108, 110, 114, 118 that can provide DSR functionality. Beneficially, the DSR functionality provides the long-sought ability to not have to completely restart a software application under development in order to test the latest changes to a software application under development, or when a debugging breakpoint has been set incorrectly, causing overshoot, for example. Leveraging on recent advances in mobile agents and containers technology (e.g., the container management software platform known as Docker), the present systems and methods provide a framework that allows recording of any application state. The mobile agent paradigm is taken from artificial intelligence theory, and is based on the agent abstraction concept. Agents in the mobile agent paradigm are software components that control autonomously their own thread of control among various things. Mobile agents are programs that can relocate from one host to another. A container management software platform is a set of integrated technologies and solutions for building, sharing, and running container-based applications. A container is a standard unit of software that packages up code for a software application and all its dependencies so the application runs quickly and reliably from one computing environment to another. DSR 100 consists of several micro services. Such micro services can include a snapshot manager service 104, a profile manager service 106, an application containerization service 108, a user interface service 110, a hot code replace service 114, and an anomaly prediction service 118. The functions of these components of DSR 100 will be further described following the description of underlying technologies, such as containerization.

In the context of a container management software platform, a container image is a lightweight, standalone, executable package of software that includes everything needed to run an application, including the application code, an executable runtime, system tools, system libraries, and settings. By "lightweight," it is meant that a container shares the operating system kernel of the machine upon which it runs and therefore does not require an operating system per application, driving higher server efficiencies and reducing server and licensing costs.

Container images become containers at runtime when they run on a container management software platform engine (e.g., the Docker engine, also known as the Docker daemon). Containerized software always runs the same, regardless of the computing infrastructure upon which it is run. Use of containers isolates a software application from its computing environment, including the computing hardware, to ensure that the software application works uniformly despite differences, for instance, between development and staging. The container-building process can be automated so that it is transparent to a developer that is not knowledgeable in container technology. A container is an empty project that is set up to use the developer's operating system distribution ("distro") of choice. For example, popular distributions of the Linux operating system include Ubuntu, Fedora, and Gentoo. A container image can be generated using a platform file (e.g., a Docker file). All of the generated files make up a project. A project can be set up, for example, using a set of dialogs, outside of a developer's IDE of choice (e.g., Visual Studio Code or Eclipse).

Figure 2B:
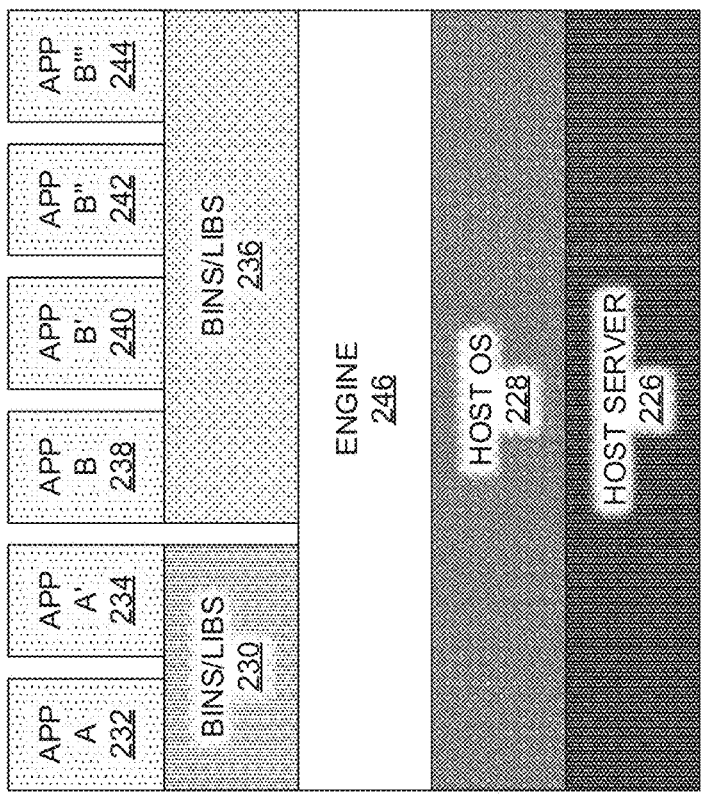
FIG. 2B is diagram illustrating an example container-based software application architecture.
Figure 2A:
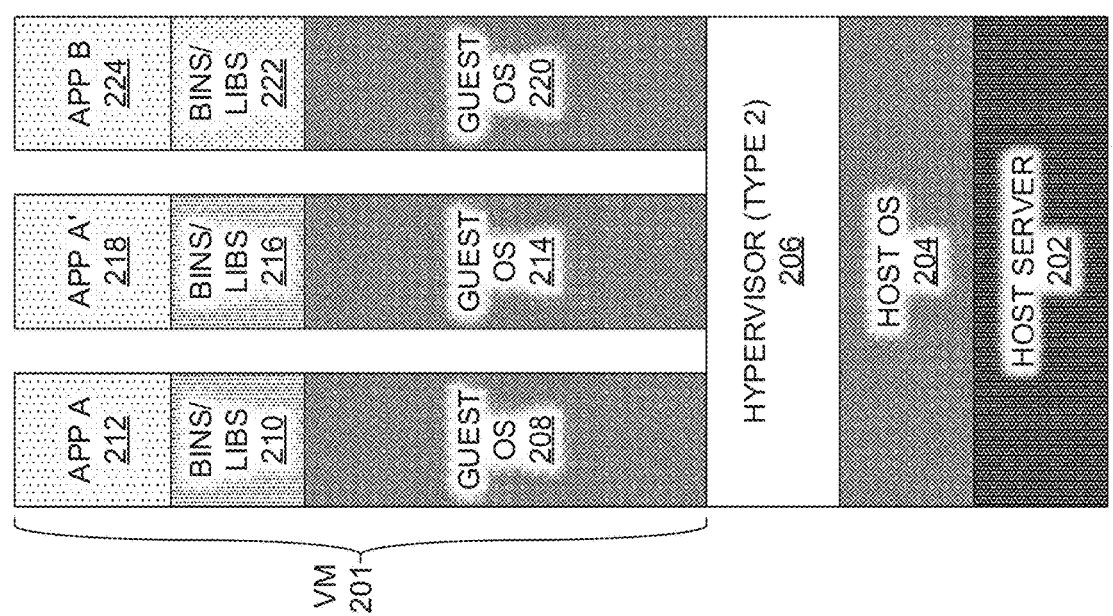
FIG. 2A is diagram illustrating an example virtual machine-based software application architecture.

Container virtualization is a lightweight alternative to virtual machines (VM), which gained traction among developers after updates to control groups (cgroups) and namespace-features in the Linux kernel. A VM is a stand-alone emulation of a complete computer system to provide the functionality of a physical computer. A VM therefore has its own operating system (OS), its own applications, and its own resources (memory, CPU, and so on) virtualized from the resources of a host server upon which the VM resides. The schema of FIG. 2A shows three VMs hosted on the same physical host server 202. Each virtual machine uses its own OS, libraries, etc. The host 202 is required to run a Type 2 hypervisor on top of its OS 204. A Type 2 hypervisor, also called a hosted hypervisor, is a virtual machine manager that is installed as a software application on an existing operating OS. On top of the hypervisor 206 run first VM 201 (consisting of guest OS 208, binaries/libraries 210, and application A 212), a second VM (consisting of guest OS 214, binaries/libraries 216, and application A' 218), and a third VM (consisting of guest OS 220, binaries/libraries 222, and application B 224). Even though applications A 212 and A' 218 share the same binaries and libraries, the VM architecture requires two instances of these to be duplicated 210, 216 in the memory of the host 202. Furthermore, even though applications A 212, A' 218, and B 224 may all run the same operating system, the VM requires three instances of the operating system 208, 214, 220 to take up memory of the host 202. Moreover, these duplicate operating systems 208, 214, 220 are required even though the OS run by each of the applications 212, 218, 224 may be identical to the OS 204 run by the host server 202, meaning that the host server 202 is required to store in memory three more operating systems than necessary. In consequence, the three VMs occupy significant amounts of the physical host's memory, and add significantly to the boot time required to bring up all running VMs.

By contrast, containers do not contain any OS, so they take up fewer resources than virtual machines on the physical host. Containers share the host's OS, including the kernel and libraries, and therefore do not need to boot a full OS. FIG. 2B shows an arrangement running six applications as containers on host server 226 running host OS 228. Applications A 232 and A' 234 can share binaries/libraries 230 and host OS 228 with each other. Applications B 238, B' 240, B" 242, and B'" 244 can share binaries/libraries 236 and host OS 228. All containerized applications can share the same host OS 228. Like VMs, containers provide file system, network, and process isolation. Unlike VMs, with containers, resource control of memory, disk, and CPU are done through cgroups without the communication-overhead of an additional kernel. This allows for effective and dense deployment of services with near-native performance and for many benefits of virtualization to be leveraged with low overhead. As opposed to running a hypervisor as a layer between guest and host operating systems, as in the VM architecture, the container architecture runs a platform engine 246 (e.g., the Docker engine) as a layer between the containers and the host OS.

VMs additionally can add to development time when developers need to test applications with different versions and must ask information technology operations personnel to deploy one or many machines (virtual or physical). By contrast, multiple containers can be instantiated by the developer with relatively simple commands, a graphical user interface, or a script. Startup time for a container is faster than a VM. Deployment of a container in a production environment involves a simple rollback process in which the deployment script is modified and the container image is redeployed. By contrast, the rollback process with VMs requires rebuilding the entire machine (or reverting to the previous snapshot/backup).

Running containers can be stopped and started again. Changes made to the file system in a running container will survive this deliberate stop and start cycle, but data in memory and running processes will not. A container that crashes cannot be restarted back to its immediately pre-crash state and will have a file system in an undetermined state if it can be restarted. A container started after it is stopped will go through its full startup routine. If any heavy-duty processes need to be started as part of container start-up, such as database server processes, the startup time can be substantial, for example, many seconds or dozens of seconds.

Computationally expensive runtime analyses add an unacceptable performance penalty for most applications. However, using a technique called record and replay, a program can be recorded at speed and then analyzed in the background with great precision without slowing down the live execution.

Using a container management software platform (e.g., Docker) can simplify the process of packaging a software application and its runtime dependencies into a single container, providing a runtime abstraction that enables the container to run across different versions of, for example, the Linux kernel. Using such a container management software platform, a developer can make a containerized application on a software development workstation and then easily deploy the container to any server that has been enabled with the container management software platform (i.e., a server that is executing the platform's engine) without having to retest or retune the container for the server environment, be that in the cloud or on premises.

A typical software delivery pipeline can include, for example, a development stage, an integration stage, and a production deployment stage. Each stage of the delivery pipeline may utilize different computing environments (e.g., including hardware and operating system). Environments that have to be built at each stage of the pipeline have the drawback of greater potential for software execution variation that can break the functionality of software. A key benefit of using a container management software platform container images, such as Docker container images, in a software delivery pipeline is that both the infrastructure and the application can both be included in a container image.

The Java software language and runtime was developed with the intention of enabling cross-platform software that could be executed identically irrespective of the hardware upon which it was executed. Thus, one of the core tenets of Java was the promise of "write once, run anywhere." However, since the Java artifact (e.g., a JAR, WAR, or EAR file) only included the software application to be executed, there was always a wide range of potential software execution variation, depending on the Java runtime version and the specific operating environment of the deployment environment.

By contrast, with a container management software platform, the entire software infrastructure (i.e., the base operating system, middleware, runtime, and the application) can be bundled in the same container image. This converged isolation lowers the potential variation at every stage of the delivery pipeline. If, for example, a developer tests a set of container images as a service on a laptop, the same service can be exactly reproduced during the integration testing and the production deployment, which may be done on computing systems different than the laptop, which computing systems may include software environment differences from laptop. The container image (i.e., the converged artifact) can be, for example, a binary file, i.e., a file that is machine-readable to execute the software application but does not in itself permit display, reading, or editing of the application's source code. In general, there will be little or no variation of a service stack at any of the stages of the pipeline when containers are used as the primary deployment mechanism.

As alternatives to containers, configuration management and release engineer scripting are often used at each stage of the pipeline to build out the service. Although most automation mechanisms are far more efficient than a checklist-built service, they still run the risk of higher variation than binary container-image-based service stacks. These alternatives to containers can yield wider variances of stability, thereby increasing undesirable execution variation. A containerized pipeline approach can deliver converged artifacts as binary files that are therefore immutable starting from the commit.

A container management software platform can provide both a development tool and a runtime environment. In such a platform, a container is an instantiation of a container image. As used herein, the word "image" means a container image. A container image is a static specification of the software content that an instantiated container will include in runtime, including the application code inside the container and runtime configuration settings. Images contain read-only layers, which means that once an image is created, it is never modified.

Figure 3:
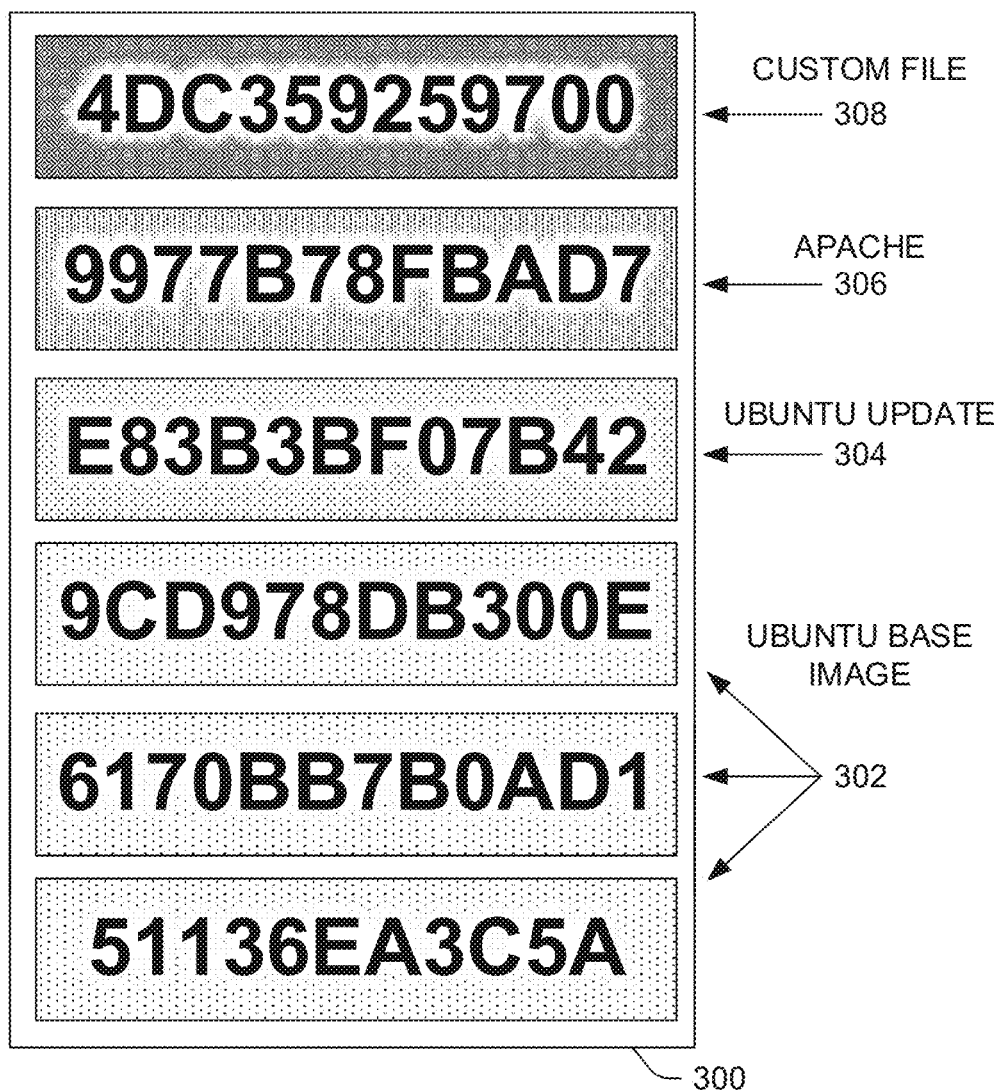
FIG. 3 is a diagram of an example container image.

FIG. 3 shows an example container image 300. Example image 300 is an Ubuntu image with an Apache installation. The Ubuntu image 300 comprises three base Ubuntu layers 302 plus an Ubuntu update layer 304, with an Apache layer 306 and a custom file layer 308 on top.

Figure 4:
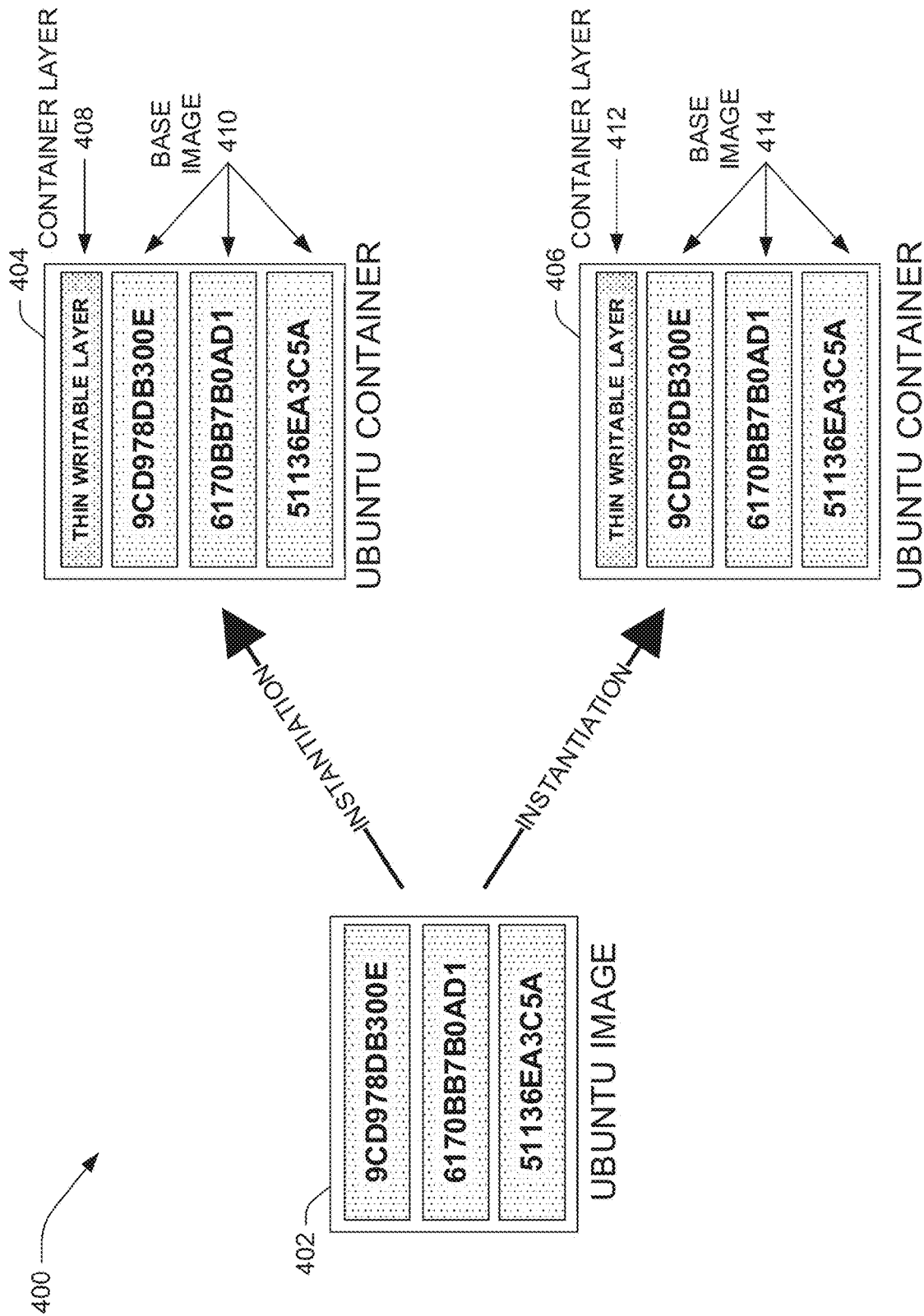
FIG. 4 is a diagram illustrating an example of instantiation of two containers from a container image.

A running container is an instantiation of an image. FIG. 4 depicts the instantiation 400 of two different running containers 404, 406 from a single image 402. Generally, containers derived from the same image are identical to each other in terms of their application code and runtime dependencies. Thus, in example 400, the layers of respective base images 410, 414 in containers 404, 406 are identical to the layers in base image 402. Unlike images, which are read-only, each running container includes a writable layer (also called the container layer) on top of the read-only content taken from the instantiating image. As shown in FIG. 4, each running container 404, 406 can have a different respective writable layer 408, 412. Runtime changes, including any writes and updates to data and files, are saved in the container layer only. Thus, multiple concurrent running containers that share the same underlying image may have different container layers.

When a running container is deleted, the writable container layer is also deleted and does not persist. However, changes made to or by a software application during the running of its container can be made to persist by executing an explicit commit command prior to deleting the container. Upon performance of the commit command, the running container content, including the writable layer, is written into a new container image and stored to the disk. This new container image is distinct from the prior image from which the running container (i.e., the container to be deleted) was previously instantiated. Using this explicit commit command, a successive, discrete set of images (e.g., Docker images) can be created, each one built on top of the previous image. In addition, a copy-on-write strategy can be used to minimize the disk footprint of containers and images that share the same base components, thus helping to optimize storage space and minimize container start time.

The runtime environment provided by the container management software platform can include a platform engine as a thin layer between containers and the operating system to effectively manage application containers. Any container built using the platform can run on any server that is enabled with the platform's execution engine, regardless of the underlying operating system. Docker daemon is an example of such a persistent runtime environment.

Platform files (e.g., Docker files) are text documents containing all the configuration information and commands needed to assemble a container image, used by the platform engine to build and automate the creation of container images, which then become the basis of running containers. Such platform files greatly simplify the steps for container image creation. A platform file can, for example, first specify a base image from which a build process starts. The platform file can then specify a succession of commands, following which a new container image can be built.

The container management software platform can also provide a set of command-line interface (CLI) commands for managing the lifecycle of image-based containers. Such CLI commands can span development functions such as build, export, and tagging, as well as runtime functions such as running, deleting, or starting and stopping a container.

Container images can be stored and published in a container registry as a software distribution mechanism that facilitates container content discovery and distribution. The container registry provides a set of utilities to pack, ship, store, discover, and reuse container content. A registry can be remote or on premises. It can be public, so everyone can use it, or private, restricted to an organization or a set of users. As an example, the Docker container registry comes with a set of common APIs that allow users to build, publish, search, download, and manage container images. Docker Hub is an example of a public, cloud-based container registry that provides image discovery, distribution, and collaboration workflow support.

Figure 5:
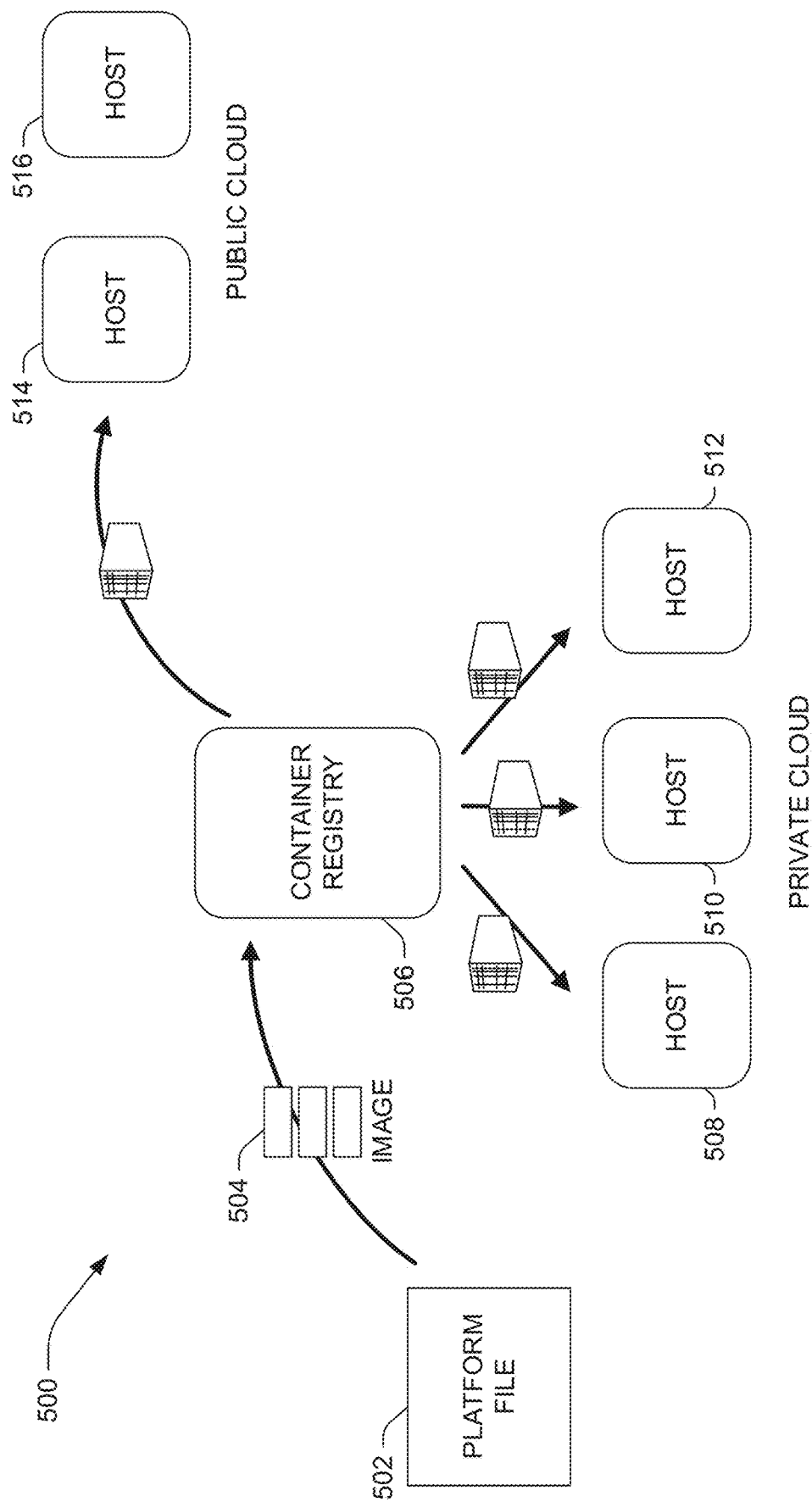
FIG. 5 is a diagram illustrating example distribution of container images from a container registry.

FIG. 5 depicts an example workflow 500 wherein a software developer uses a platform file 502 (e.g., a Docker file) to construct a container image 504 that is then uploaded to a container registry 506 that permits others to pull the image 504 from the registry 506 to make production containers and deploy them to hosts 508, 510, 512, 514, 516, wherever they are, be it in a private cloud (hosts 508, 510, 512) or a public cloud (hosts 514, 516), each host being enabled with the container management software platform's engine. Five hosts are pictured in the example workflow 500, but there could be an unlimited number of such hosts.

A conventional way of suspending processes running on a Linux system is to use the SIGSTOP and SIGCONT signals. This is not always sufficient for userspace because it is noticeable by parent processes in a waiting or ptrace state. The signal SIGSTOP cannot be caught by the task itself while SIGCONT can. This can lead to problems where these signals are broken by other programs trying to stop and resume tasks. However, a container management software platform can include a built-in pause command capable of suspending a running container and its processes. On Linux, this command leverages a cgroup freezer that uses kernel freezer code to prevent a freeze/unfreeze cycle from being visible to tasks being frozen. All affected processes are unaware that they are in a frozen state and the state is not visible by the tasks being frozen. Working hierarchically, freezing the cgroup also freezes descendants. Each cgroup has its own parent-state and a self-state. If both of these states are thawed, then the cgroup is also thawed.

The container management software platform can further provide checkpoint/restore (C/R) functionality. Several mature, robust software platforms include checkpoint/restore (C/R) (also known as checkpoint/restart) functionality to checkpoint parallel processes running on native hardware. The most widely used such C/R software platforms are Distributed Multi-Threaded Checkpointing (DMTCP), Berkeley Lab Checkpoint/Restart (BLCR), and Checkpoint/Restore In Userspace (CRIU). CRIU provides the ability to freeze running applications and their process trees, writing them to persistent storage as a collection of one or more image files. These image files contain memory pages, file descriptors, inter-process communication and process information from the/proc file system. First, a process dumper can collect threads walking through the/proc/$pid/task directory and the /proc/$pid/task/$tid/children directory, gathering recursive information from the child processes. Reading all the information that it knows about these collected tasks, CRIU can then dump them to image files that can later be restored.

The container management software Docker has a built-in pause and an experimental C/R functionality, requiring Linux kernel 3.11 or higher, that uses CRIU to freeze a running application (or part of it) and checkpoint it as a collection of files on disk. These files can then be used to restore the application and run it exactly as it was just prior to the time of the freeze. Using straightforward Docker commands, a snapshot can be taken of a running container. Such a command may, for example, take the form of "docker checkpoint create <container name> <checkpointname>". At a later moment in time, this created snapshot can be started as the same container, with a command of the form of "docker start-checkpoint <checkpointname> <container name>", or as a different container. The container that is started from a checkpoint is in the same state, with respect to memory and processes, as the container was when the checkpoint was created. Additionally, the startup time of the container from the snapshot is very short (e.g., subsecond). For containers with fairly long startup times, this rapid startup can mean substantial time and money savings to the software development cycle. However, a CRIU checkpoint does not capture changes in the file system made in a container. Only the memory state is part of the snapshot. This snapshotting functionality can be utilized even on a physical host running Microsoft Windows (e.g., Windows 1) by running Linux (e.g., Ubuntu 16.04 LTX (Xenial)) within a VM on the Windows host. As an example, such a VM can be created on a Windows host using Vagrant 2.0.3 and VirtualBox 5.2.8.

With regard again to FIG. 1 to continue the architecture overview of the DSR 100, the snapshot manager service 104 saves and reloads container snapshots (also referred to as "checkpoints") to record and replay execution of a software application. A snapshot is created from a container image that is running. The recording of container snapshots can, for example, leverage existing CRIU functionality in Docker to capture application state information to disk. DSR 100 allows configuration of save triggers manually, or according to time or performance thresholds. The snapshot manager service 104 can collect all the snapshots recorded and provide them graphically to the user within the user's IDE.

Figure 6:
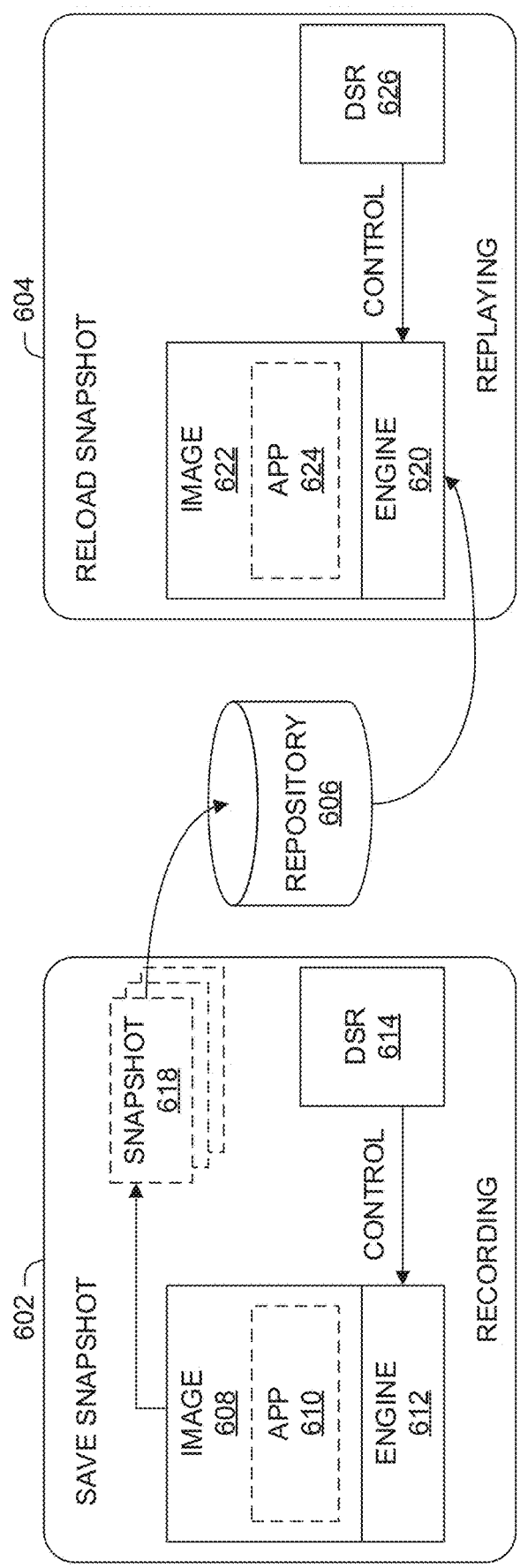
FIG. 6 is a diagram illustrating example software application execution recording and playback functionality enabled by the saving, storing, and reloading of container snapshots.

FIG. 6 illustrates example recording 602 and replaying 604 enabled via the saving of such snapshots and storing of such snapshots to a snapshot repository 606, which can reside, for example, on a local hard disk, a cloud-based storage solution, or other non-transitory computer-readable media. The snapshot manager service of DSR 614 (which can correspond, for example, to snapshot manager service 104 of DSR 100 of FIG. 1) controls a platform engine 612 (e.g., a Docker daemon) running a container image 608 including a software application 610 under development to create a series of snapshots 618. The snapshot manager service can store basic information associated with each snapshot 618. Manual triggers allow the user to label the snapshots manually, whereas time-based triggers can be configured to automatically label the snapshots they create using the elapsed time since initial execution, and performance-threshold triggers can be configured to label snapshots with details describing a trigger-causing metric, such as CPU, memory, or disk utilization.

To replay 604 an application from an application state recorded in a snapshot, a snapshot manager service of a DSR 626, which can be the same as or different from DSR 614, loads a saved snapshot stored to the repository 606 by the recording process 602, by controlling a platform engine 620, which can be the same as or different from platform engine 612, instantiating a version of application 610 as application 624 from container image 622 at the recorded application state by loading the application state information earlier saved to the now-loaded snapshot. Then, DSR 626 can re-executing all the snapshots using the platform framework (e.g., Docker framework) to restore the application to the point in time selected by the user.

Running containers can be paused and unpaused by a DSR 100. To pause one or more running containers with parallel processes executing inside them, the platform engine (e.g., the Docker engine) can call a freezer subsystem, for example, the Linux cgroup freezer subsystem. Processes inside containers are automatically placed in cgroups, which the freezer subsystem uses to allocate processes to be frozen and thawed. The pausing of running containers by the platform engine places their processes in frozen states. This allows for CPU cycles to be released for other tasks, effectively freeing up some critical resources in a cluster, such as expensive software licenses linked to physical hardware. This freezing has several benefits but is not without drawbacks. The paused container still resides in volatile RAM and will not survive a crash or reboot. If one container or part of a job is lost, then the whole job has to be restarted over again. When unpausing containers, processes are converted to thawed states.

DSR 100 can further include a user interface service 110 to provide user interface functionality between the DSR 100 and a human developer or other external user. The DSR 100 can, for example, provide integration with IDEs such as Eclipse and VS Code using plugins written for these IDEs. The user interface service 110 can use a plugin application-programmer interface (API) to interface with DSR services. Alternatively or in addition, a stand-alone graphical user interface of the DSR can provide capability to record and replay running containers. For debugging to be enabled, a supported IDE configured with an appropriate plugin (e.g., Eclipse plugin 120 or VS Code plugin 122) can be used to load source code for the application being debugged. User interface service 110 can make use of an IDE plugin manager 112 to coordinate with the appropriate plugin 120, 122. For simplicity, FIG. 1 illustrates only two such plugins, but other IDEs can be supported with other such plugins. A graphical user interface provided by the user interface service 110 can include, for example, play/pause, fast-forward, and rewind buttons permitting time-travel navigation throughout the execution of a software application under development or test.

DSR 100 can further include a hot code replace service 114 to enable hot code replacement, i.e., the re-writing of software application code without necessitating the restarting of an application and the repetition of input and/or processing steps to return the software application to its application state at a running point of interest. The hot code replace service 114 can use a plugin infrastructure to extend support to different computer programming languages, such as C, C++, Java, C#, and Python. As an example, a Java plugin can utilize the functionality of Dynamic Code Evolution Virtual Machine (DCEVM), as available from GitHub. Hot code replace service 114 can make use of a language plugin manager 116 to coordinate with the appropriate plugin 124, 126, 168, 130. For simplicity, FIG. 1 illustrates only four such plugins, but other programming languages can be supported with other such plugins.

Using DSR 100 enabled with a hot code replace service 114, hot code replacement works as follows. The developer starts the application under debug under the DSR 100 (e.g., to enable the app containerization service 108 and snapshot manager service 104 features) and starts collecting snapshots, either manually or automatically. Using previous snapshots, the developer is able to determine the faulty code using the debugger (e.g., using break points). Upon a developer making a change (i.e., insertion, deletion, or modification) to a portion of the source code of the application under debug (e.g., in an IDE in communication with the DSR 100 via a plugin and the user interface service 110), the modified application replaces the original instantaneously in memory. The modified application execution continues as normal. New snapshots are subsequently stored (i.e., after code modification) allowing the developer to bring the running of the containerized application to any execution the modified portion of the source code. As such, the application need not be completely restarted in order to test the effects of the modified code.

The hot code replacement enabled by DSR 100 provides greater usability than can be provided with a Java virtual machine (JVM) hot code replace (HCR), which can be used only to change a method body but cannot change a method signature, add fields, add constants, or make other hot code changes. The hot code replacement enabled by DSR 100 also provides greater usability over a conventional "hot redeploy" feature offered by some containers and application servers, which generally still necessitate the total restarting of an application for which Java code has been replaced. The hot code replace service 114 can, for example, provide a modified JVM capable of handling more types of dynamic code changes and thus solving most of the limitations of a conventional JVM HCR. Examples of the types of hot code replacement that are enabled by hot code replace service 114 include: changing body of a method, including a static method; changing the name of a method; changing the signature of a method; adding and removing methods; adding, removing or changing constants; adding, removing or changing fields; adding or removing annotations from classes and methods; changing new inner classes; and introducing or modifying lambda expressions in Java 8 code. Hot code replace service 114 may also be able to permit changing class hierarchy and introducing new high-level, inner and anonymous classes.

Figure 7:
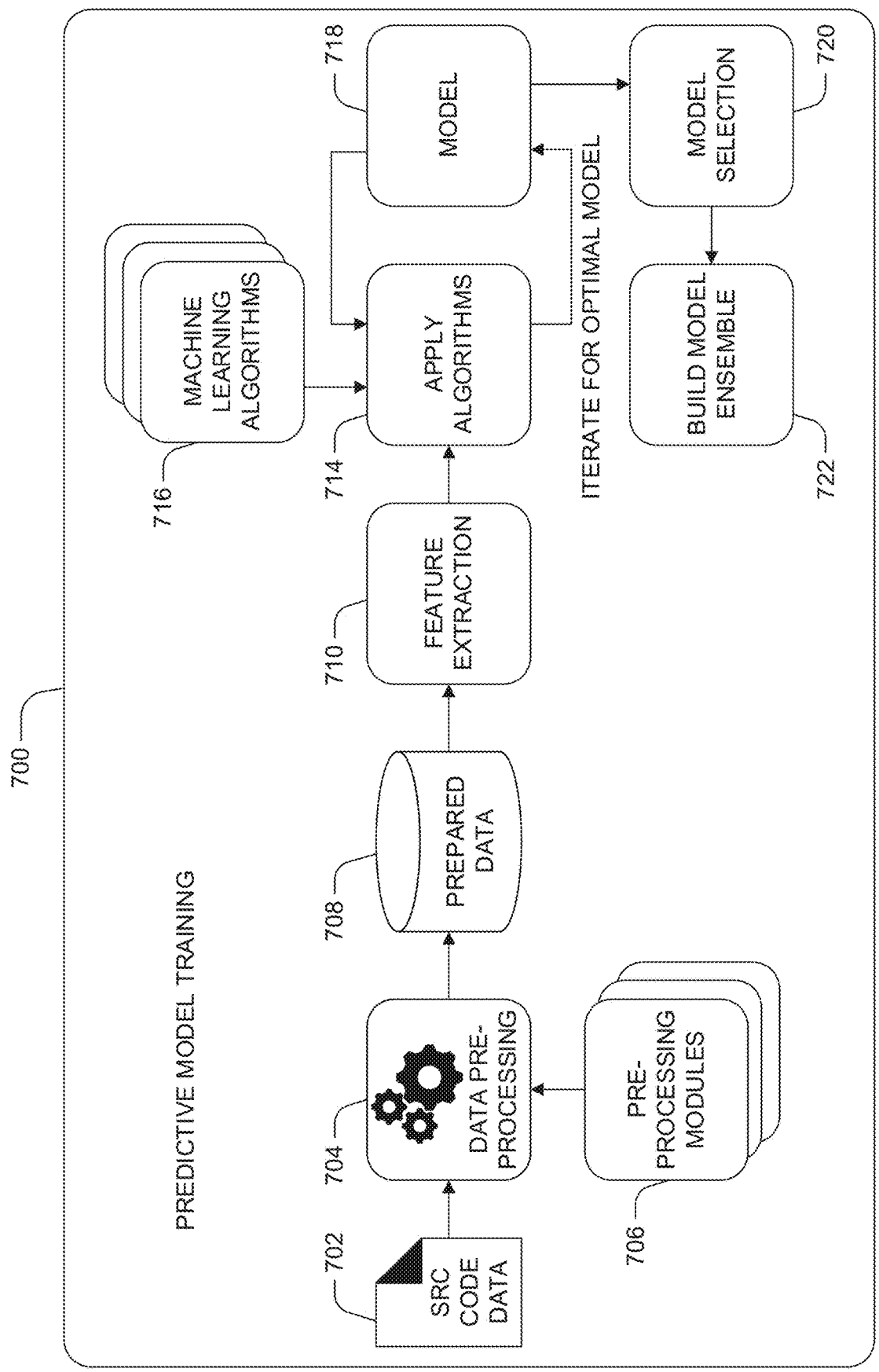
FIG. 7 is a flow chart illustrating an example predictive model training process.

DSR 100 can further include an anomaly prediction service 118 to enable the prediction of anomalies in an application analyzed by a user with the aid of the DSR 100 and the setting of debugging information (e.g., breakpoints) and/or the creation of snapshots based on the anomaly prediction. Anomalies can, for example, include software bugs causing unintended functioning, code causing memory leaks or excessive CPU, memory, or disk access usage, code that can result in infinite loops or other behavior that will hang a process, code that throws an error message, code that presents a security flaw, and code that crashes a process. Based on the source code of the application being available to the DSR 100 for new analysis, the DSR 100 can scan the source code using a previously trained unsupervised machine-learning (ML) model 132 to predict potential vulnerabilities in the newly analyzed source code. If the source code is not available for analysis, the ML model 132 can be trained with performance metrics (such as CPU or memory utilization) of the current application to predict anomalies against previous runs. FIG. 7 illustrates an example of predictive model training 700 that builds a model ensemble 722 based on source code data 702, pre-processing modules 706, and machine learning algorithms 716. The source code data 702 can, for example, include source code producing known anomalies at known locations in the source code. The source code data 702 is pre-processed 704 using the pre-processing modules 706 to generate prepared data 708 stored in one or more non-transitory computer readable media. Feature extraction is performed on this prepared data 710 and machine learning algorithms 716 are applied 714 to the extracted features to generate a model 718 that is optimized in an iterative process. Model selection 720 can be performed on one or more generated models and from the selected models a model ensemble 722 can be built which can then be provided to the DSR 100 as its predictive ML model 132. Once source code is analyzed by the anomaly prediction service 118 by processing it using the trained predictive ML model 132, predicted anomalies can serve as the basis for snapshot creation by the snapshot manager service 104 or debugging information creation, such as insertion of one or more proposed breakpoints, which can be proposed or inserted via the user interface service 110 in communication with an IDE. As an example, based on the anomaly prediction service 118 predicting that the application under development will produce anomalous functioning upon execution of a certain portion of its source code, anomaly prediction service 118 can direct snapshot manager service 104 to generate a snapshot of the application at a point in its execution just prior to the execution of the portion of the source code predicted to be a source of anomalous functioning.

DSR 100 can further include a profile manager service 106 to provide the ability to import and/or export a profile of the application being recorded and/or debugged. The service is configured to package to disk as an exportable profile all or a selection of snapshots generated by the snapshot manager service 104, along with the project descriptors and at least one container image (e.g., at least one Docker container). Generated profiles can later be shared externally with other developers or testers.

DSR 100 can further include an application containerization service 108 configured to automate the process of creating a container image (e.g., a Docker image). "Containerizing" an application is the process of making it able to run and deploy under containers or similar technologies that encapsulate an application with its operating system environment (a full system image). Because containers provide the application with an environment very similar to one that allows full control of a system, containerization modernizes the deployment of the application while making minimal or no changes to the application itself. For example, containerization provides a basis for incrementally making the application's architecture more cloud-friendly. Other benefits of containerization include: greater ease of deployment, for example, by replacing a whole container image with a new one; greater ease of automating deployments, for example by having deployments driven completely from a continuous integration (CI) system; greater ease of rolling back a malfunctioning deployment of a software application, for example, by simply switching back to a previous image (i.e., an image of the software application prior to a code change that caused the malfunction); greater ease of automating application updates, because there are no "intermediate state" steps that can fail (either the whole deployment succeeds, or it all fails); the ability to test the same container image in a separate test environment, and then deploy the container image to a production environment, with certainty that the application tested is exactly the same as the application running in production; and easier recovery of a failed system, since a new container with exactly the same application can be automatically spun up on new hardware and attached to the same data stores. Furthermore, developers are enabled to run containers locally to test their work in progress in a realistic environment. Hardware can be used more efficiently, by running multiple containerized applications on a single host that ordinarily could not easily share a single system. Containerizing is a good first step toward supporting no-downtime upgrades, canary deployments, high availability, and horizontal scaling.

Preparation for creation of snapshots by DSR 100 can include identifying filesystem locations where persistent data is written during the execution of the application. Because deploying a new version of the application is performed by replacing the image, any persistent data must be stored outside of the container. In some instances, the application writes all its data to a single specific filesystem path, but many legacy applications spread generated data in different locations within the filesystem and/or intermingle it within the application itself. In either case, the volume mount used by the DSR 100, for example, Docker's volume mounts, enables exposure of the host's filesystem to specific locations in the container filesystem so that data survives between containers. These specific locations can be identified prior to snapshot creation to allow them to persist. An application can in some instances be coded to support writing all data within a single tree in a filesystem, simplifying deployment of the containerized version of the application, but this is not strictly necessary, and in many instances such modification of the application can be impractical.

Preparation for creation of snapshots by DSR 100 can further include identifying configuration files and values that will vary by environment. Because a single image should be usable in multiple environments (e.g., test and production environments) so as to ensure consistency, any configuration values that will vary by environment must be identified so that the container can be appropriately configured with these values at application startup time. These configuration values can, for example, take the form of environment variables, or of values within one or more configuration files. An application can in some instances be coded to support reading all configuration values from environment variables, simplifying its containerization, but again, this is not strictly necessary, and in many instances such modification of the application can be impractical.

Preparation for creation of snapshots by DSR 100 can further include identifying services that can be easily externalized. The application may use some services running on the local machine that are easy to externalize due to being highly independent and/or supporting communication by TCP/IP. Examples of such highly independent, easily externalizable services include a database server such as MySQL or PostgreSQL or a cache such as Redis running on the local system. Configurations may need to be adjusted to support specifying a hostname and port rather than assuming the service can be reached on localhost.

Creation of snapshots by DSR 100 can further include creating one or more container images. DSR 100 starts with a base image of the preferred operating system, installs any prerequisites, and then runs the containerization scripts. The app containerization service 108 adds the startup script configuration and creates a platform file (e.g., a Docker file).

The listing shown in FIG. 8 provides a simple example Docker file. The illustrated example starts with an official Ubuntu 16.04 Docker image, installs prerequisite Ubuntu packages, copies the application into an image, runs an application setup script, switches to the application directory, and then specifies an application startup script. Running the application in the Docker container can then be performed by a command such as the one shown in the listing in FIG. 9. This listing is a single-line command, broken up into multiple lines by backslashes.

A platform file (e.g., Docker file) can be generated by DSM 100 or provided by a user of DSM 100. The file can include packages that allow debugging. In cases where the platform file is not provided, the user can be assigned a "base" image that the user can extend with simple modifications on the platform file. Because a container might not have the same the same dynamic linked libraries (DLLs) that are in a host system, and because it can be impossible to predicted which libraries might be included, the developer may have to ensure that the libraries are properly setup. In order to reduce the workload on the developer, host system's available libraries can be made easily linkable to the container, for example, by sharing volumes based on the target being an x86-64 container. In such case, a networked filesystem can be used to provide the libraries to the container.

Process profiling can provide a developer with insight on how an application process consumes resources, such as memory, hard disk accesses, and CPU cycles. A profile can be used to trigger automatic debug checkpoints under execution conditions that are outliers or deviate from the established norm.

DSR 100 can be configured to operate in one of three modes corresponding to the three software development phases of development, testing, and production. Development mode can serve as a default mode for an IDE extension (e.g., either of the plugins 120, 122 in FIG. 1). In development mode, source code of an application under development is available to the IDE and debugging information is included or includable. For example, where the software application is a compiled application, an executable of the software application has been compiled with debugging information (e.g., breakpoints) included and non-stripped. This development mode allows the developer to checkpoint, debug, and rewind/fast forward the application's execution to any point in time.

In testing mode, the executable has been compiled with debugging information and the container has been packaged into a binary file to be exported for the testing process. The testing process consists of one or more human testers running tests on the binary file, without source code being available for the tester(s). Instead, the checkpoints generated during testing serve as feedback for the one or more developers, who do have access to the source code, enabling the developer(s) to examine whatever faulty operational states may have been caught by the tester(s). Testing mode can be conducted with the DSR 100 functioning as a stand-alone application, i.e., without the need to use an IDE. Then, being in receipt of testing results and back in development mode, developer(s) are able to link test results with the source code, which is needed to help the debugger resolve symbols and add extra information about the debugging session.

In production mode, the executable has been compiled without debugging information. The use of a container in production is optional, but the DSR 100 can still be capable of rewind/fast-forward functionality where a production application is containerized.

The export of checkpoints for storage for later analysis and/or for sharing with other developers involves packaging a container and the desired checkpoint. A debug-checkpoint image can be modularized so that it can be re-used with other IDEs. A checkpoint can contain, for example, the state of the system; information about the checkpoint trigger (whether manual or automated either by timing or performance metric); checkpoint-descriptive metadata such as labels or tags to help describe the checkpoint; and information about the system state preceding and subsequent to the checkpoint.

DSR 100 can further include an orchestration engine 102 to coordinate the functions of the different services 104, 106, 108, 110, 114, 118 of the DSR 100, allocate computing resources between the services, pass data between the services, and so forth.

Figure 10:
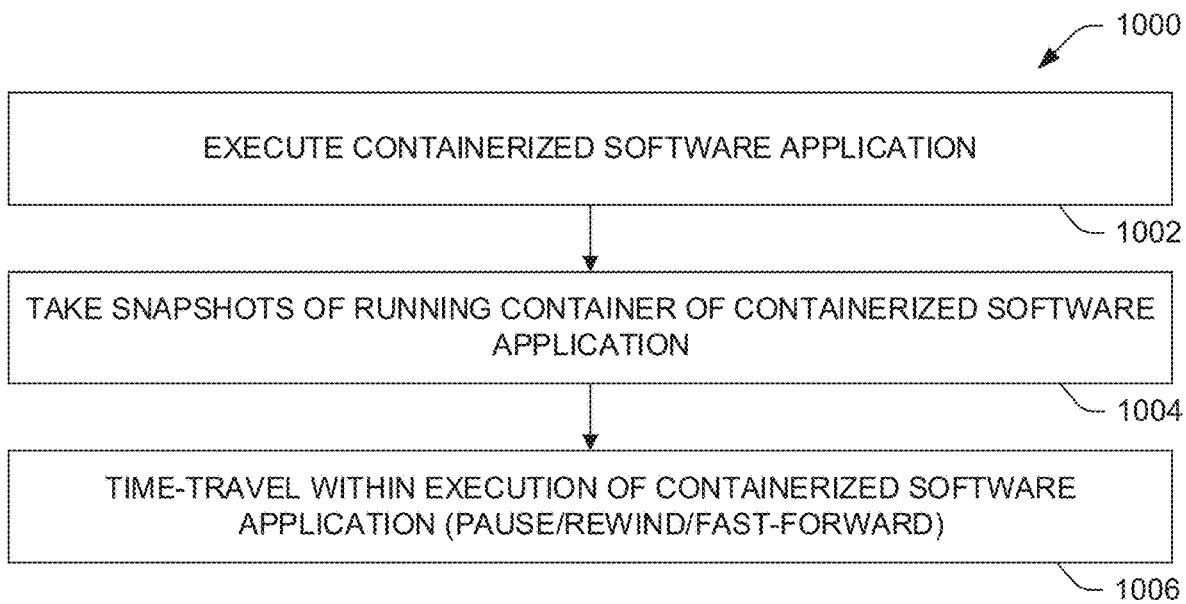
FIG. 10 is a flow chart of an example method of time-travel debugging.

FIG. 10 illustrates an example method 1000 of time-travel debugging. A host computer system (having a processor) can execute 1002 a containerized software application. This can be done, for example, by instantiating a container from a container image, as described previously. Snapshots can then be taken 1004 of a running container of the containerized software application. These snapshots can be taken, for example, using checkpoint/restore functionality of a container management software platform. For example, the snapshots can be taken by the snapshot manager service 104 of FIG. 1. The snapshots can be based, for example, on one or more of manual input of a user, elapsed time of execution of the containerized software application, and/or resource utilization of the containerized software application exceeding or falling below one or more thresholds, as described above. A user can then provide inputs to the computer system (e.g., via a graphical user interface providing control buttons) to time-travel 1006 within the execution of the containerized software application, e.g., by pausing, rewinding, and fast-forwarding the execution of the containerized software application.

Figure 11:
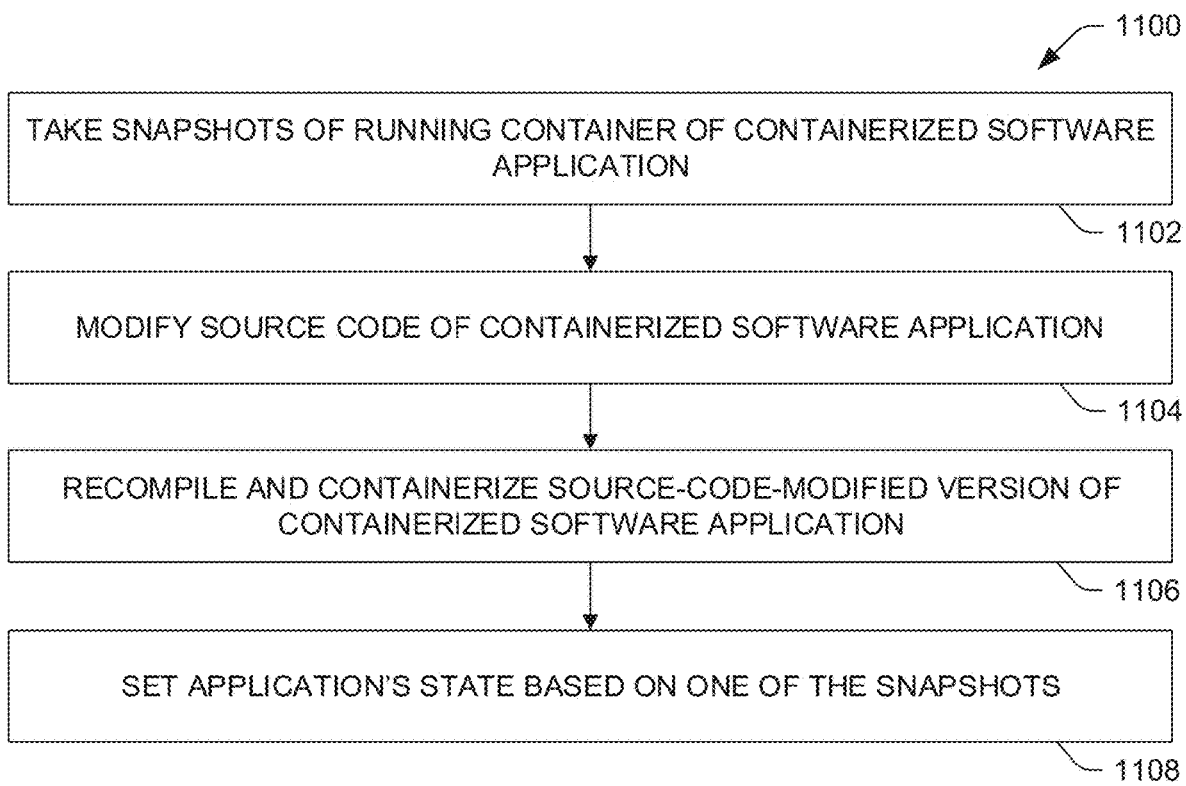
FIG. 11 is a flow chart of an example method of hot code replacement.

FIG. 11 illustrates an example method 1100 of hot code replacement. Snapshots are taken 1102 of a running container of a containerized software application. The source code of the containerized software application is then modified 1004, e.g., by editing the source code in an IDE such as VS Code, which IDE can be provided with an extension or plugin enabling time-travel debugging with hot code replacement, as described above. The source-code-modified version of the containerized software application is then recompiled and containerized 1106, and its application state is set 1108 based on one of the snapshots. The source-code-modified version of the containerized software application is thus effectively played back starting from the set application state, which can be an application state corresponding to the execution of the application at a point prior to the execution of modifications to the application's source code. Advantageously, this can be done without restarting the application from its initial state. Hot code replacement is thereby achieved.

A computer-readable medium (or media) can contain instructions that execute to command a computer processor to perform either of the above methods 1000 or 1100, alone or in conjunction with one another.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system for time-travel debugging, the system comprising: a host computer system comprising a processor and a non-transitory machine-readable media configured to store a digital software recorder (DSR) application and at least one containerized software application, the processor configured to execute the DSR application to provide an ability to pause, rewind, and fast-forward execution of the at least one containerized software application, the DSR application comprising:

a snapshot manager service configured to create container snapshots of a running container of the at least one containerized software application using checkpoint/restore functionality of a container management software platform, the container snapshots being based on one or more of manual input of a user, elapsed time of execution of the at least one containerized software application, and/or resource utilization of the at least one containerized software application exceeding or falling below one or more thresholds, the creating of the container snapshots comprising:

identifying filesystem locations where persistent data is written during the execution of the at least one containerized software application, identifying configuration files and values that vary by environment, identifying services to be externalized, and creating one or more container images of the at least one containerized software application;

an application containerization service configured to automate the process of creating the one or more container images of the at least one containerized software application; and a profile manager service configured to package as an exportable profile one or more of the container snapshots generated by the snapshot manager service along with one or more container images generated by the application containerization service.

2. The system of claim 1, wherein the container management software platform is Docker.

3. The system of claim 1, the DSR application further comprising a hot code replace service configured to enable playback of a source-code-modified version of the at least one containerized software application starting from an application state corresponding to the execution of the application at a point prior to execution of modifications to the application's source code without restarting the application from its initial state, the hot code replace service being configured to recompile and containerize the source-code-modified version of the at least one containerized software application and to set its application state based on one of the container snapshots created by the snapshot manager service.

4. The system of claim 1, the DSR application further comprising a user interface service configured with an integrated development environment (IDE) plugin manager configured to communicate with a plugin to at least one IDE.

5. The system of claim 4, wherein the plugin to at least on IDE is a Microsoft Visual Studio Code extension or an Eclipse plugin.

6. The system of claim 1, the DSR application further comprising an anomaly prediction service configured to predict anomalies in the execution of the at least one containerized software application by one of analyzing source code of the at least one containerized software application with a trained unsupervised machine-learning (ML) model that has been trained on source code data from other software applications, or analyzing execution performance of the at least one containerized software application with an ML model that has been trained with performance metrics of the at least one containerized software application collected during runs of the at least one containerized software application, the DSR application being configured to generate one of container snapshots of the at least one containerized software application or debugging information within the at least one containerized software application based on the predicted anomalies.

7. The system of claim 1, wherein the processor is configured to execute the DSR application to provide the ability to pause, rewind, and fast-forward execution of the at least one containerized software application without access to source code of the containerized software application.

8. A method for time-travel debugging, the method comprising:
    executing, by a host computer system having a processor, a containerized software application;
    creating container snapshots of a running container of the containerized software application using checkpoint/restore functionality of a container management software platform, the container snapshots being based on one or more of manual input of a user, elapsed time of execution of the containerized software application, and/or resource utilization of the containerized software application exceeding or falling below one or more thresholds, the creating of the container snapshots comprising:
        identifying filesystem locations where persistent data is written during the execution of the at least one containerized software application, identifying configuration files and values that vary by environment, identifying services to be externalized, and creating one or more container images of the at least one containerized software application;
    a user time-traveling within the execution of the containerized software application by pausing, rewinding, and fast-forwarding the execution of the containerized software application; and
    packaging as an exportable profile one or more of the container snapshots along with the one or more container images.

9. The method of claim 8, wherein the container management software platform is Docker.

10. The method of claim 8, further comprising playing back a source-code-modified version of the containerized software application starting from an application state corresponding to the execution of the application at a point prior to execution of modifications to the application's source code without restarting the application from its initial state at least in part by recompiling and containerizing the source-code-modified version of the containerized software application and setting its application state based on one of the container snapshots.

11. The method of claim 8, further comprising providing a graphical user interface rendering controls configured to provide an ability to pause, play, rewind, and fast-forward execution of the containerized software application.

12. The method of claim 11, wherein the graphical user interface is provided by a plugin or extension to an integrated development environment (IDE).

13. The method of claim 8, further comprising predicting anomalies in the execution of the containerized software application by one of analyzing source code of the containerized software application with a trained unsupervised machine-learning (ML) model that has been trained on source code data from other software applications, or analyzing execution performance of the containerized software application with an ML model that has been trained with performance metrics of the containerized software application collected during runs of the containerized software application, and generating one of container snapshots of the containerized software application or debugging information within the containerized software application based on the predicted anomalies.

14. The method of claim 8, wherein the user time-traveling within the execution of the containerized software application by pausing, rewinding, and fast-forwarding the execution of the containerized software application is done without access to source code of the containerized software application.

15. One or more non-transitory computer-readable media storing instructions that when executed by a computer processor, cause the processor to:
    execute, by a host computer system having a processor, a containerized software application;
    create container snapshots of a running container of the containerized software application using checkpoint/restore functionality of a container management software platform, the container snapshots being based on one or more of manual input of a user, elapsed time of execution of the containerized software application, and/or resource utilization of the containerized software application exceeding or falling below one or more thresholds, the creating of the container snapshots comprising:
        identifying filesystem locations where persistent data is written during the execution of the at least one containerized software application, identifying configuration files and values that vary by environment, identifying services to be externalized, and creating one or more container images of the at least one containerized software application;
    time-travel within the execution of the containerized software application by pausing, rewinding, and fast-forwarding the execution of the containerized software application based on user input; and
    package as an exportable profile one or more of the container snapshots along with the one or more container images.

16. The computer-readable media of claim 15, wherein the container management software platform is Docker.

17. The computer-readable media of claim 15, the instructions further causing the processor to play back a source-code-modified version of the containerized software application starting from an application state corresponding to the execution of the application at a point prior to execution of modifications to the application's source code without restarting the application from its initial state at least in part by recompiling and containerizing the source-code-modified version of the containerized software application and setting its application state based on one of the container snapshots.

18. The computer-readable media of claim 15, the instructions further causing the processor to providing a graphical user interface rendering controls configured to provide an ability to pause, play, rewind, and fast-forward execution of the containerized software application.

19. The computer-readable media of claim 15, the instructions further causing the processor to predict anomalies in the execution of the containerized software application by one of analyzing source code of the containerized software application with a trained unsupervised machine-learning (ML) model that has been trained on source code data from other software applications, or analyzing execution performance of the containerized software application with an ML model that has been trained with performance metrics of the containerized software application collected during runs of the containerized software application, and to generate one of container snapshots of the containerized software application or debugging information within the containerized software application based on the predicted anomalies.

20. The computer-readable media of claim 15, wherein the instructions cause the processor to time-travel within the execution of the containerized software application without access to source code of the containerized software application.

\* \* \* \* \*